United States Patent [19]

Douma et al.

[11] Patent Number: 5,583,965
[45] Date of Patent: Dec. 10, 1996

[54] METHODS AND APPARATUS FOR TRAINING AND OPERATING VOICE RECOGNITION SYSTEMS

[75] Inventors: Peter Douma, Wykoff, N.J.; Geoffrey Anderson, Cornwall, N.Y.; Masaaki Akahane, Mahwah; Semyon Mizikovsky, Union, both of N.J.

[73] Assignees: Sony Corporation, Tokyo, Japan; Sony Electronics, Inc., Park Ridge, N.J.

[21] Appl. No.: 302,460

[22] Filed: Sep. 12, 1994

[51] Int. Cl.⁶ .................................................... G10L 3/00
[52] U.S. Cl. .......................... 395/2.84; 395/2.55; 395/2.6
[58] Field of Search ............................... 395/2, 2.4, 2.41, 395/2.55, 2.6, 2.67, 2.79, 2.84; 381/51

[56] References Cited

U.S. PATENT DOCUMENTS 5,086,385  2/1992  Launey et al. ........................ 395/2.84
5,386,494  1/1995  White .................................... 395/2.84
5,450,525  9/1995  Russell et al. ........................ 395/2.84

*Primary Examiner*—Kee M. Tung
*Attorney, Agent, or Firm*—William S. Frommer; Alvin Sinderbrand

[57] ABSTRACT

A voice recognition system and method for training the same are provided wherein a first voice signal representing an instruction as well as a predetermined instruction signal corresponding to the first voice signal and identifying the instruction are input to the voice recognition system. The system processes the first voice signal based on the predetermined instruction signal to produce voice recognition data for use by the system in identifying the instruction based on a second voice signal representing the same instruction. The processor stores the voice recognition data for subsequent use upon receipt of the second voice signal and carries out the instruction in response to the predetermined instruction signal corresponding to the first voice signal.

13 Claims, 4 Drawing Sheets

METHODS AND APPARATUS FOR TRAINING AND OPERATING VOICE RECOGNITION SYSTEMS

BACKGROUND OF THE INVENTION

The present invention relates to voice recognition systems and methods involving training to identify an instruction corresponding to a voice signal.

Conventional voice recognition systems are categorized generally as either speaker independent systems which are intended to recognize instructions corresponding to voice signals without training of the system to identify such instructions, and speaker dependent systems which employ such training. In the case of speaker dependent systems, voice samples are supplied to the system in response to a request from the system that a certain word or groups of words be spoken. The system processes the received voice signal to produce voice recognition data for future use in identifying an instruction corresponding to the same word or words expressed by the voice signal. In general, the greater the number of such samples provided to the system, the more reliably it operates subsequently to identify an instruction corresponding to a particular voice signal.

The training periods required for operating such speaker dependent systems are typically quite lengthy and complex. Users often find the training procedures tedious and wasteful.

Training is normally conducted in a single session on a given day. During the session, the user of the system provides a large number of voice samples to the system so that it can "train" by matching the received voice samples to data indicating the corresponding instruction. However, one's voice changes from day to day. For example, illness or stress can cause one's voice to change over the course of time. Consequently, the voice samples provided during the usual single training session might not be fairly representative of the speaker's voice under different conditions.

OBJECTS AND SUMMARY OF THE INVENTION

It is an object of the present invention to overcome the problems and shortcomings of conventional voice recognition systems as expressed above.

It is another object of the present invention to provide methods and systems for voice recognition which may be trained at the same time that they are put into use, so that a separate training procedure is not required.

In accordance with a first aspect of the invention, a method for training and operating a voice recognition system is provided, comprising the steps of: inputting a first voice signal to a voice recognition system, the first voice signal representing an instruction for the system; inputting a first predetermined instruction signal to the system, the first predetermined instruction signal corresponding to the first voice signal and identifying the instruction separately of the first voice signal; processing the first voice signal based on the first predetermined instruction signal with the voice recognition system to produce voice recognition data for use by the system in identifying a second voice signal corresponding to the first voice signal and representing the instruction; storing the voice recognition data in the system; carrying out the instruction with the use of the voice recognition system in response to the first predetermined instruction signal corresponding to the first voice signal; inputting the second voice signal; identifying the instruction represented by the second voice signal based on the voice recognition data; and carrying out the identified instruction.

In accordance with another aspect of the present invention, a voice recognition system is provided comprising: a digital voice recognition processor programmed to receive a first voice signal corresponding to a predetermined instruction, a first predetermined instruction signal corresponding to the first voice signal and identifying the instruction separately of the first voice signal, and a second voice signal representing the predetermined instruction; means for inputting the first and second voice signals to the processor; and means for inputting the predetermined instruction signal to the processor; the processor being programmed further to process the first voice signal based on the first predetermined instruction signal to produce voice recognition data enabling the processor to identify the instruction based on the second voice signal, to store the voice recognition data and to carry out the predetermined instruction based on the second voice signal and the voice recognition data; the processor being programmed to carry out the predetermined instruction in response to the first predetermined instruction signal corresponding to the first voice signal.

In accordance with a further aspect of the present invention, a voice recognition control system comprises: means for inputting a first voice signal representing an instruction for the system; means for inputting a first predetermined instruction signal corresponding to the first voice signal and identifying the instruction separately of the first voice signal; and processing means for processing the first voice signal based on the first predetermined instruction signal to produce voice recognition data for identifying a second voice signal corresponding to the first voice signal and representing the instruction; the processing means being operative to store the voice recognition data in the system and to carry out the instruction in response to the first predetermined instruction signal corresponding to the first voice signal; the means for inputting the first voice signal being further operative to input the second voice signal; the processing means being operative to identify the instruction represented by the second voice signal based on the voice recognition data and to carry out the identified instruction.

The above, and other objects, features and advantageous of the present invention, will be apparent in the detailed description of certain advantageous embodiments thereof which is to be read in connection with the accompanying drawings forming a part hereof, and wherein corresponding parts and components are identified by the same reference numerals in the several views of the drawings.

DETAILED DESCRIPTION OF CERTAIN ADVANTAGEOUS EMBODIMENTS

Figure 1:
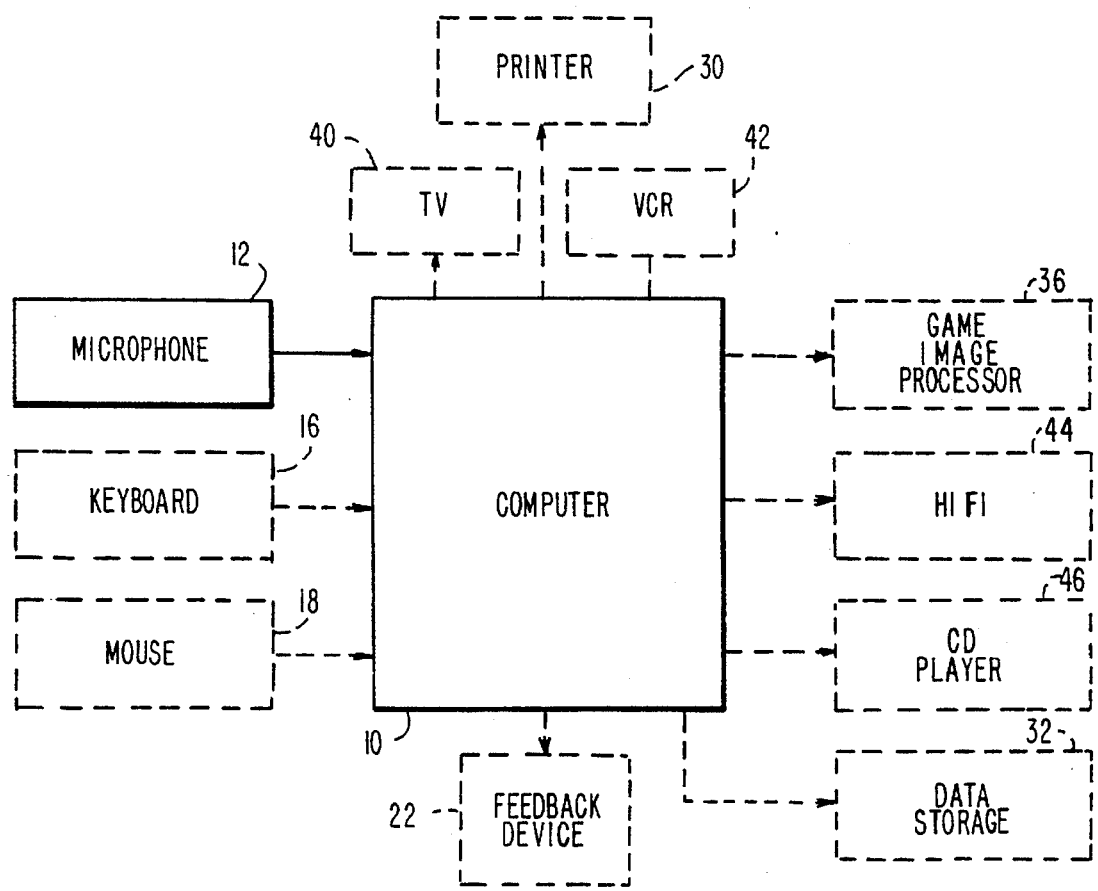
FIG. 1 is a generalized block diagram of various embodiments of voice recognition systems in accordance with the present invention.

With reference now to FIG. 1, a generalized block diagram of a computerized voice recognition system in accordance with various embodiments of the present invention is illustrated therein. The system of FIG. 1 includes a computer 10 programmed to carry out voice recognition based on digitized voice data produced from sounds spoken by a user and received by a microphone 12. The voice recognition function of computer 10 is carried out by comparing voice data produced with the use of microphone 12 or a signature derived therefrom with voice recognition data previously stored by the computer 10. The computer 10 may be implemented, for example, by a microprocessor, microcomputer, digital signal processor (DSP), RISC, CISC or other digital processor. The functions carried out by computer 10 are carried out in other embodiments by multiple processors or a combination of different types of processors (such as a microcontroller and a DSP). In still other embodiments, application specific integrated circuits (ASIC's) employing neural nets or fuzzy logic are employed to carry out the functions of computer 10.

The system of FIG. 1 further includes at least one input device which enables a user to input instruction data to the computer 10 separately from the voice data input with the use of microphone 12. In certain embodiments, a keyboard 16 coupled with the computer 10 is provided for this purpose. In other embodiments, a mouse 18 coupled with the computer 10 serves this purpose. Moreover, in certain embodiments both a keyboard 16 and mouse 18 are provided to afford the user an option for inputting instruction data. Keyboard 16 and mouse 18 are depicted in block form using dashed lines, as are further elements discussed below, to indicate that one or more of these devices are selected for use in a given embodiment depending on the application. Various other input devices, such as buttons, switches, keypads, touch sensitive displays, etc., may be employed to input data instructions, although not illustrated in FIG. 1 for simplicity and clarity. Keypads and remote control devices are useful for many consumer electronic devices for inputting instructions and may also be employed in place of keyboard and/or mouse 18.

The generalized system of FIG. 1 also includes a feedback device 22 coupled with computer 10 which serves to provide information to the user from the computer 10. Where an embodiment takes the form of a personal computer system, a monitor or other suitable visual display typically serves as the feedback device 22. In consumer electronic applications, LED, LCD and other types of visual displays are typically employed. In some embodiments, an audible feedback device is employed such as a speaker or other sound transducer to provide coded sounds or synthesized speech as feedback to the user. However, the use of feedback device 22 is not essential to the present invention.

The computer 10 responds to received instruction data by carrying out an action such as storage of data therein or output of display data or sound data to the feedback device 22 or to another peripheral. Exemplary instructions which may be carried out by the computer 10 in response to such instruction data include changing directories, opening and closing files, editing files, printing, outputting other control signals to one or more peripherals, and so on. In short, the actions which may be so initiated include any which may be executed by a computer.

In many applications, the computer 10 is used to control a function of a peripheral device such as a printer 30 coupled with the computer 10, and a data storage device 32. For example, documents produced and stored in the form of data through speech recognition may be printed by means of the printer 30 under the control of the computer 10.

The system of the present invention finds a broad range of applications in the consumer electronics field. In one such application, the computer 10 controls a game image processor 36 in a video game apparatus to produce and modify image data to be displayed by a television set or monitor in playing a video game. The computer 10 responds to voice commands received via the microphone 12 for controlling the movement of objects within an image represented by such image data or else a change in the point of view of such an image.

In other applications, various functions of a TV 40, a VCR 42, a high fidelity sound reproduction system 44 and/or a CD player 46 are controlled by the computer 10 in response to a voice command input via the microphone 12. Other types of consumer and office electronics devices (such as answering machines and remote controllers), toys, home appliances (such as door openers) and other devices may be controlled with the use of the invention.

Figure 2:
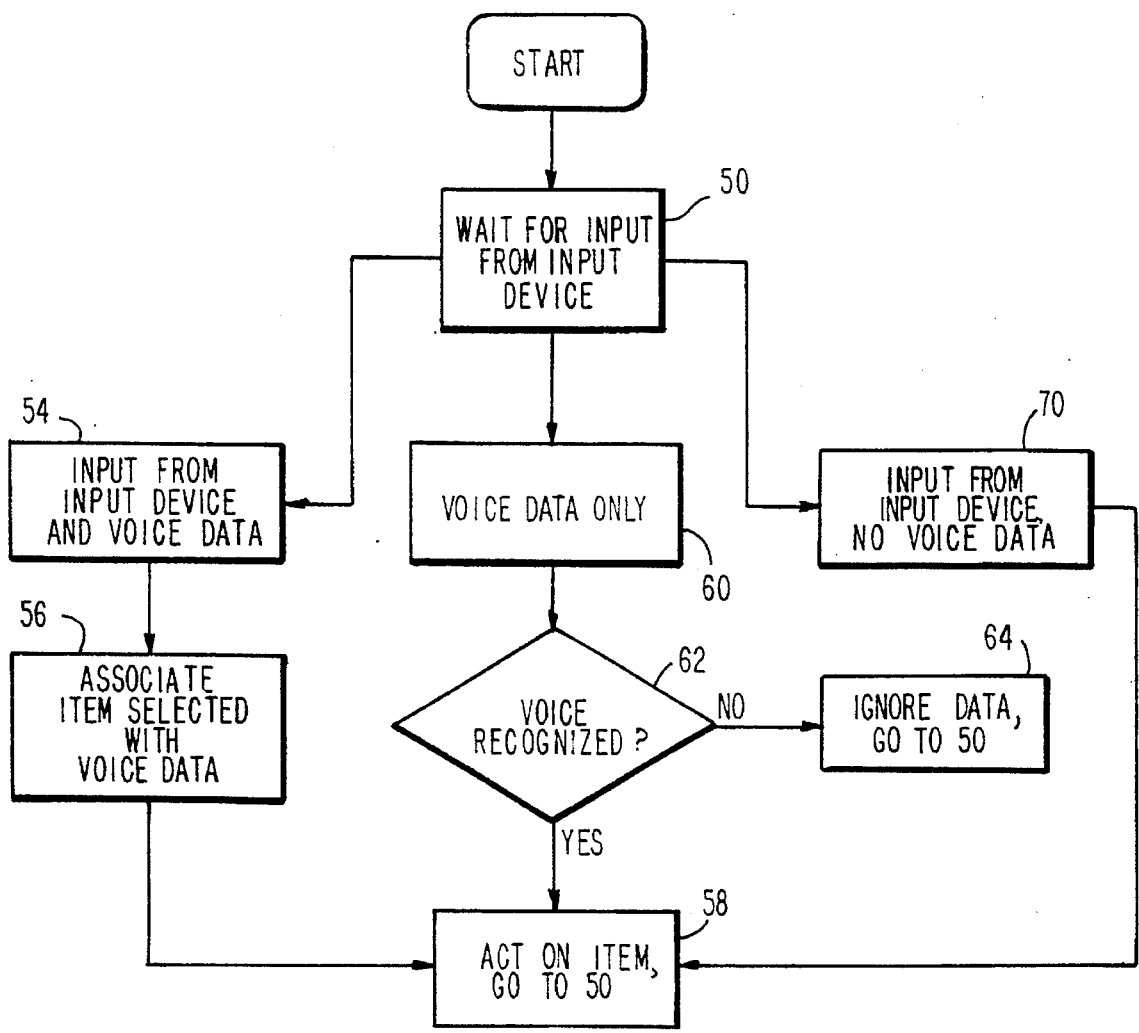
FIG. 2 is a flow chart for use in illustrating operation of the voice recognition systems of FIG. 1.

With reference also to the flow chart of FIG. 2, an operation of the computer 10 in one embodiment in responding to a voice input and/or an input from one of the input devices 16, 18 or otherwise to carry out an instruction is illustrated therein. Once the system has been initiated, the computer 10 waits to receive at least one of an input from an input device and voice data input with the use of the microphone 12. Upon receipt of one or more such signals, in a step 50 the computer 10 determines whether it has received (1) both an input from an input device as well as voice data received by means of the microphone 12, (2) voice data only, or (3) an input from the input device without receipt of voice data. In case (1), the computer 10 produces a training mode signal; in case (2), it produces a voice recognition mode signal; and in case (3), it produces a non-voice command signal. Input of voice data may be determined by monitoring power levels of data produced with the use of microphone 12. However, in the alternative mode selection may be carried out by means of a switch or soft key. In case (1), in response to the training mode signal the computer 10 proceeds to a step 54 to store the input as well as the voice data to carry out a training function, as indicated in a step 56. In the training function of step 56, the computer 10 produces voice recognition data which it stores for future use in identifying the same spoken word, words or other sounds from the user. The voice recognition data is stored in association with data identifying an instruction designated by means of the corresponding input from the input device, such as the keyboard 16, mouse 18 or other input device. The voice recognition data is thus associated with an instruction code representing the corresponding instruction to be carried out upon receipt of voice data matching the voice recognition data. The nature of the instruction will, of course, depend upon the application and the particular action which the user wishes to associate with the spoken voice command. For example, a user may wish the computer to respond to a voice command "open file" to open a designated computer file or access such a function.

While the computer may store voice recognition data in the form of digitized received voice sounds, preferably the received sounds are processed to produce a voice signature requiring less data and which is easier to match with a subsequently produced signature representing a subsequently input voice signal. Such signatures can be produced, for example, by carrying out one or more spectral analyses of a received voice signal. For example, the received signal may be separated into time segments and each segment then subjected to a spectral analysis, such as a Fast Fourier Transform, to separate each segment into spectral components. A signature may then be produced from the various spectral components of the segments. The signatures are stored by the computer 10 in memory circuits, a hard drive, memory disk, tape or other storage device or medium for subsequent use in matching a stored signature with the signature of a received voice signal. Each signature is stored with a code representing the corresponding instruction to be carried out by the computer 10, so that once a match has been made, the instruction code is then used by the computer 10 to carry out the corresponding action. Preferably, the system of FIGS. 1 and 2 does not generate audible emissions during the training mode.

The input from the device 16 or 18 provided along with the voice data identifies the instruction. Based on this input, in a step 58 the computer 10 carries out the corresponding instruction. Accordingly, the system is placed into use for carrying out a desired function at the same time that it is separately trained to recognize voice commands.

If, however, only voice data has been input to the computer 10 without an accompanying input from a device such as the keyboard 16, mouse 18 or other device (i.e., case (2) above), in response to the voice recognition mode signal, the computer inputs the voice data in a step 60 and computer 10 either attempts to match the voice data directly with stored voice recognition data or else converts the voice data to a signature which is then used to determine whether a match exists with any stored signature. If a match is found, as determined in a step 62, the computer proceeds in step 58 to execute the corresponding instruction and then return to step 50. If, however, a match is not found, as indicated by the step 62, the computer ignores the voice data (step 64). Then the computer returns to the step 50 to await further inputs. In addition, the computer, in certain embodiments, outputs an appropriate indication to the user via the feedback device 22 that the voice data was not recognized.

Finally, if in the step 50 an input from an input device is received without any accompanying voice data (i.e., case (3)), in response the computer proceeds as indicated by step 70 directly to step 58 to act upon the instruction represented by the input.

In case (1) described above, the computer 10 not only trains itself to recognize a particular voice command by storing appropriate voice recognition data and associating it with an input separately identifying the corresponding instruction, but it also carries out the command which is identified by the input. The input may be supplied concurrently by means of the keyboard 16, the mouse 18 or other device. Accordingly, the system may be put to use immediately as it trains itself to recognize voice commands, and the training period may be extended over days or even weeks. A further benefit thus realized is that changes in the user's voice over the same period (which might not be encountered during the course of a single training session) will be experienced by the system so that it produces voice recognition data representative of the user's voice under different conditions which could affect the quality of the user's voice.

The present invention is particularly useful in telephone applications especially where the need to locate and press switch buttons is distracting and preferably is carried out without the need to look away from some activity which simultaneously requires the user's attention. In further embodiments of the present invention, telephones are provided with a voice recognition function which permits training of the function at the same time that the telephone is being controlled by the input of instruction data through a keypad or the like so that it is put to use right away.

Figure 3:
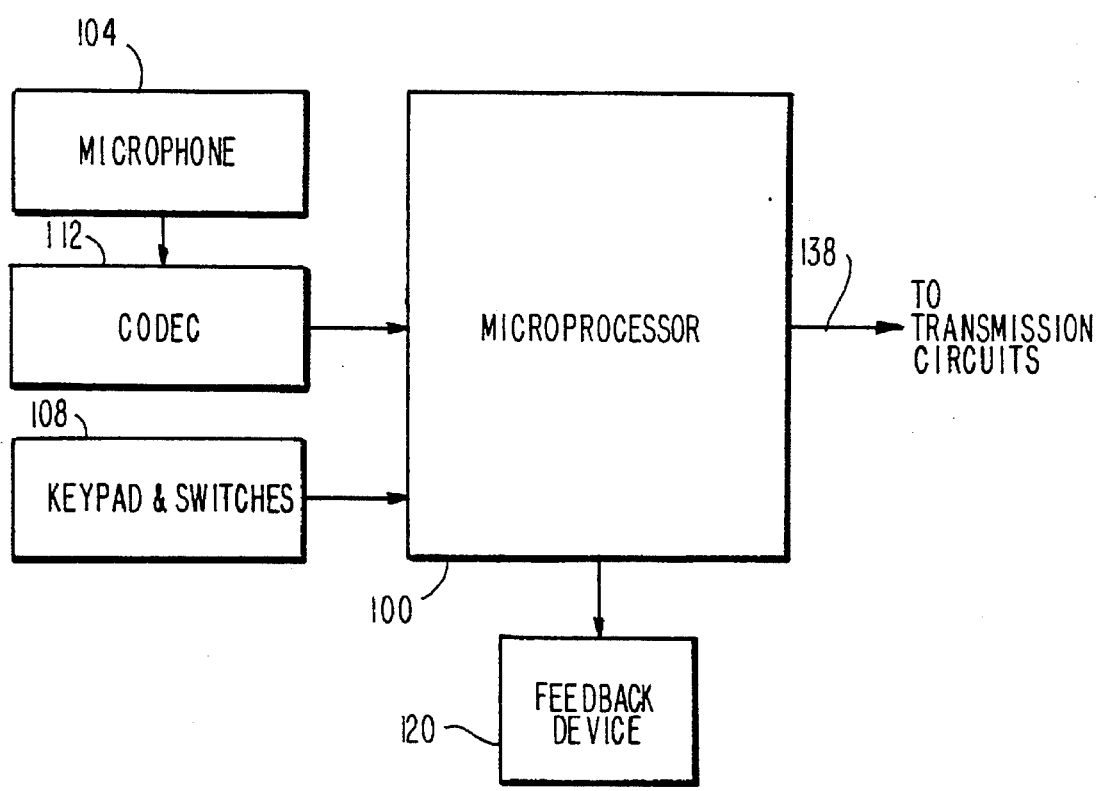
FIG. 3 is a block diagram of a control system for a cellular telephone in accordance with certain embodiments of the present invention.

An embodiment of a control system of a cellular telephone having a voice recognition capability in accordance with the present invention is illustrated in FIG. 3 in block diagram format. In the system of FIG. 3, a microprocessor and associated program and main memories are indicated by a block 100. The microprocessor is programmed to respond either to voice data input by means of a microphone 104 or an input from a keypad or one or more switches (such as an off-hook switch), collectively indicated by a block 108 coupled to the microprocessor 100. The microprocessor provides a voice signal to a codec 112 which carries out analog-to-digital conversion of the voice signal. The codec 112 also carries out digital compression of the voice signal for cellular transmission.

The system also includes a feedback device 120 which receives an output from the microprocessor 100 and provides a corresponding user-understandable signal to the user as information fed back from the microprocessor 100. In various embodiments the feedback device 120 is comprised of one or more of an LCD, LED or other visual display, and/or a voice synthesizer, tone generator or other sound generating device.

The control system of FIG. 3 serves to control the various operations of the cellular telephone, including operating mode selection, generation of DTMF tones, etc., in response to inputs from the keypad and/or switches 108 or to voice data input with the use of the microphone 104 and the codec 112. The overall operation of the FIG. 3 system will now be described in connection with the flow chart of FIG. 4.

Figure 4:
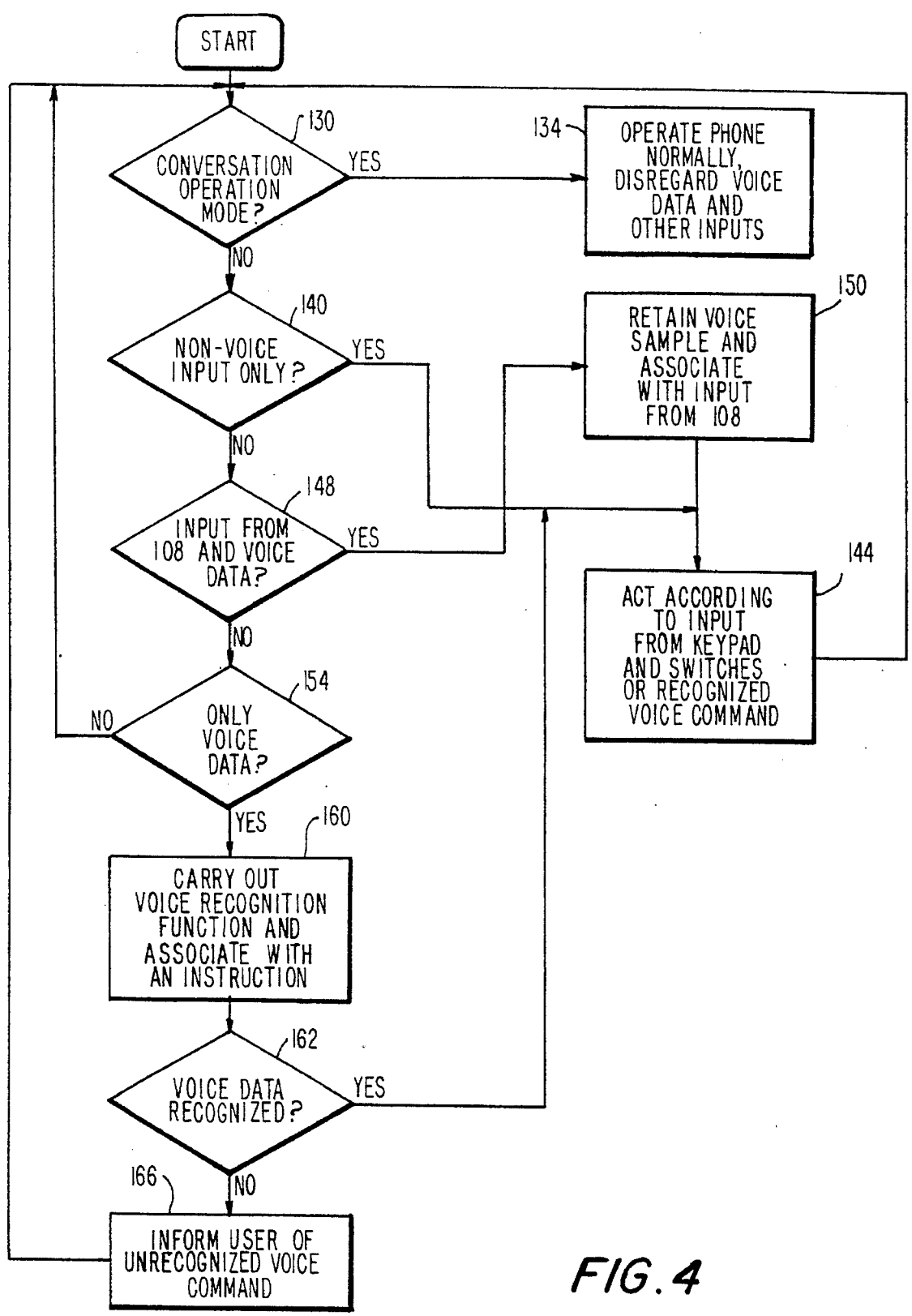
FIG. 4 is a flow chart for use in illustrating operation of the control system of FIG. 3.

In a step 130 of FIG. 4, the microprocessor 100 determines, based upon an input from one of the keypad and switches 108 whether the user has selected a conversation operating mode of the cellular telephone. If so, in a step 134, the microprocessor 100 ignores further voice data and inputs from the keypad and switches 108, and instead outputs digitized voice signals and DTMF tones via an output 138 (FIG. 3) to transmission circuits of the cellular telephone (not shown for purposes of simplicity and clarity) for carrying on a telephone conversation.

If in the step 130 it is determined that the conversation operating mode has not been selected, or if the conversation operating mode has been discontinued as indicated by an input from one of the keypad and switches 108, processing continues to a step 140 where it is determined whether an input has been received from one of the keypad and switches 108 without an accompanying voice input from the microphone 104 and codec 112. Detection of a voice signal may be carried out, for example, by detecting power levels represented by data output from the codec 112 to determine whether a predetermined power level threshold has been exceeded, thus indicating that a voice signal has been received. If a non-voice input only has been received by the microprocessor 100, as indicated by the step 140 the microprocessor proceeds to carry out an instruction represented by the input, as indicated in a step 144. The input may represent standard cellular telephone operating instructions, such as an instruction to go off-hook, produce a respective DTMF tone, initiate the conversation operating mode, etc. Once step 144 has been carried out, processing returns to step 130.

If, however, the inquiry of the step 140 is answered in the negative, processing continues in a step 148 in which it is determined whether both an input from one of the input devices 108 and voice data have been received by the microprocessor 100. If so, in a step 150 the microprocessor 100 either stores voice sample data or produces a signature for the input voice data and stores either the sample or the signature with an indication of the command represented by the input from the devices 108 for future use in recognizing a voice command and carrying out the corresponding instruction identified by the data associated with the voice sample or signature. Preferably, generation of DTMF tones and other audible emissions by the telephone are suppressed in this mode of operation until all voice data been entered. As a further feature in certain embodiments, after a telephone number has been entered, a verbal identifier (such as the name of the person whose telephone number has been entered) may be spoken into microphone 104 and also entered. The microprocessor 100 responds by storing voice sample data or a corresponding signature with data identifying the associated telephone number. Then processing continues in the step 144 in which the microprocessor carries out the instruction indicated by the input from the device 108.

If the answer to the inquiry in step 148 is negative, in a further step 154 it is determined whether only voice data has been received by the microprocessor 100. If so, in a step 160 the microprocessor 100 attempts to match either a sample of the newly received voice data or a corresponding signature with either voice data or a signature stored in its memory to produce a match. If a match is produced, as indicated in a subsequent step 162, the corresponding data stored with the voice sample or signature which has matched is used to carry out the indicated instruction in the step 144. For example, if the voice data or signature matches stored data representing the name of a person and indicating his or her telephone number, microprocessor 100 responds by outputting corresponding DTMF tones or else a command to the transmission circuits to generate the tones representing that telephone number, in order to place a call. If, however, the voice data does not produce a match, the user is informed by means of the feedback device 120 that a voice command has not been recognized, as indicated in the step 166 and processing returns to the step 130.

Accordingly, it will be appreciated that the system of FIGS. 3 and 4 carries out a voice recognition training function simultaneously with operation of the cellular telephone. That is, to train the system, a user operates a selected button or switch and simultaneously speaks the corresponding command into the microphone 104. The cellular telephone under the control of the microprocessor 100 responds to the command input by means of the button or switch and simultaneously stores appropriate voice sample or signature data for carrying out a voice recognition function at a later time. Accordingly, a separate training session is not required, but rather the cellular telephone may be placed in use immediately as training to recognize voice commands is simultaneously carried out.

It will be appreciated that the embodiment of FIGS. 3 and 4 may also be employed in telephones other than cellular telephones.

Although specific embodiments of the invention have been described in detail herein with reference to the accompanying drawings, it is to be understood that the invention is not limited to those precise embodiments and that various changes and modifications may be effected therein by one skilled in the art without departing from the scope or spirit of the invention as defined in the appended claims.

What is claimed is:

1. A method for training and operating a voice recognition system, comprising the steps of:

inputting a first voice signal to a voice recognition system, the first voice signal representing an instruction for the system;

inputting a first predetermined instruction signal to the system, the first predetermined instruction signal corresponding to the first voice signal and identifying the instruction separately of the first voice signal;

processing the first voice signal based on the first predetermined instruction signal with the voice recognition system to produce voice recognition data for use by the system in identifying a second voice signal corresponding to the first voice signal and representing the instruction;

storing the voice recognition data in the system;

carrying out the instruction with the use of the voice recognition system in response to the first predetermined instruction signal corresponding to the first voice signal;

inputting the second voice signal;

identifying the instruction represented by the second voice signal based on the voice recognition data; and carrying out the identified instruction.

2. The method of claim 1, further comprising the step of producing a training mode signal in response to the input of the first voice signal with the first predetermined instruction signal, and wherein the step of processing the first voice signal is carried out in response to the training mode signal.

3. The method of claim 1, further comprising the step of producing a voice recognition mode signal in response to the input of the second voice signal in the absence of the input of a corresponding signal with the second voice signal identifying the instruction separately from the second voice signal, and wherein the step of identifying the instruction represented by the second voice signal is carried out in response to the voice recognition mode signal.

4. The method of claim 1, further comprising the steps of producing a non-voice command signal in response to an input of a second predetermined instruction signal identifying the instruction and in the absence of a concurrent input of a voice signal to the system, and carrying out the instruction based on the second predetermined instruction signal and the non-voice command signal.

5. The method of claim 1, wherein the steps of inputting the voice signals comprise entering first and second voice signals representing an instruction for operating a telephone, and the steps of carrying out the instruction and the identified instruction comprise carrying out said instruction for operating a telephone.

6. The method of claim 1, wherein the steps of inputting the voice signals comprise entering first and second voice signals representing an instruction for operating a device selected from one of a television receiver, a video cassette recorder, a video game image processor, a high fidelity audio reproduction system and a compact disk player and the steps of carrying out the instruction and the identified instruction comprise carrying out the instruction for operating the selected device.

7. A voice recognition system, comprising:

a digital voice recognition processor programmed to receive a first voice signal corresponding to a predetermined instruction, a predetermined instruction signal corresponding to the first voice signal and identifying the instruction separately of the first voice signal, and a second voice signal representing the predetermined instruction;

means for inputting the first and second voice signals to the processor; and means for inputting the predetermined instruction signal to the processor;

the processor being programmed further to process the first voice signal based on the predetermined instruction signal to produce voice recognition data enabling the processor to identify the instruction based on the second voice signal, to store the voice recognition data and to carry out the predetermined instruction based on the second voice signal and the voice recognition data;

the processor being programmed to carry out the predetermined instruction in response to the predetermined instruction signal corresponding to the first voice signal.

8. The voice recognition system of claim 7, wherein the digital voice recognition processor is operative to output a control signal upon carrying out the predetermined instruction.

9. The voice recognition system of claim 8, in combination with a telephone coupled with the output of the digital voice recognition processor to receive said control signal for controlling an operation of said telephone.

10. The voice recognition system of claim 8, in combination with one of a television receiver, a video cassette recorder, a video game image processor, a high fidelity audio reproduction system and a compact disc player coupled with said output to receive the control signal for controlling the operation thereof.

11. A voice recognition control system, comprising:

means for inputting a first voice signal representing an instruction for the system;

means for inputting a predetermined instruction signal corresponding to the first voice signal and identifying the instruction separately of the first voice signal; and processing means for processing the first voice signal based on the predetermined instruction signal to produce voice recognition data for identifying a second voice signal corresponding to the first voice signal and representing the instruction;

the processing means being operative to store the voice recognition data in the system and to carry out the instruction in response to the predetermined instruction signal corresponding to the first voice signal;

the means for inputting the first voice signal being further operative to input the second voice signal;

the processing means being operative to identify the instruction represented by the second voice signal based on the voice recognition data and to carry out the identified instruction.

12. The voice recognition system of claim 11, wherein the processing means is operative to control operation of a telephone based on each of the predetermined instruction signal and the second voice signal.

13. The voice recognition system of claim 11, wherein the processing means is operative to control the operation of one of a television receiver, a video cassette recorder, a video game image processor, a high fidelity audio reproduction system and a compact disk player in response to each of the predetermined instruction signal and the second voice signal.

* * * * *